2,947,650

ADHESIVE

James S. Gerhardt and William F. Fowler, Jr., Rochester, N.Y., assignors to Eastman Kodak Company, Rochester, N.Y., a corporation of New Jersey No Drawing. Filed June 13, 1958, Ser. No. 741,754

2 Claims. (Cl. 117—122)

This invention concerns a pressure senstive adhesive for use on adhesive tapes, more particularly for use in the photographic industry.

Various adhesives are known which have wide use for pressure sensitive adhesive tapes. Many of these are based on natural or synthetic rubber, resinous materials and the like. However, it is known that the rubber containing formulations are subject to oxidation, and also very often have objectionable oozing, particularly under pressure.

Certain adhesives based on vinyl resins such as the polyvinyl ethers, vinyl esters and the like are temperature sensitive and lose their desirable properties at temperatures somewhat above room temperature. Other adhesives have objectionable photographic activity due to the components contained therein and may fog a highly sensitive photographic emulsion or the like.

We have discovered a pressure sensitive adhesive which is based on a copolymer within a certain range of proportions which has a minimum of photographic activity and which has satisfactory pressure adhesion.

One object of this invention is to provide a pressure sensitive adhesive for use in preparing adhesive tapes having either a fabric or a paper backing. Another object is to provide an adhesive tape which may be used in the photographic industry having a minimum of photographic activity. A further object is to provide an adhesive relatively stable with temperature change and which resists oxidation.

The above objects are obtained by using a copolymer of 2-ethylhexyl acrylate and styrene which is prepared by emulsion polymerization and then preferably dissolved in benzene. In the preparation of the copolymer we use ratios between 30 mole percent 2-ethylhexyl acrylate to 70 mole percent styrene up to about a 50:50 molar ratio. Our preferred monomer ratio comprises 40 mole percent of 2-ethylhexyl acrylate with 60 mole percent of styrene. After preparing the copolymer by emulsion polymerization, the copolymer is coagulated, filtered, dried and preferably dissolved in benzene.

Other components such as pigments and fillers such as those currently found in adhesive tapes, provided they are not photographically active, including zinc oxide, corn starch, lanolin, titanium oxide, china clay, calcium carbonate, Lithophone and other starches such as wheat starch may be used. Petroleum jelly, hydrogenated abiethyl alcohol, hydrogenated abietic esters, hydrocarbon resins such as the Piccolyte resins, coumarone-indene resins and other soft resins of the non-oxidizing type may be used.

After the adhesive has been compounded it may be applied to paper backings of various sorts such as latex filled papers, high tensile, laminated papers and others. It may also be coated on cloth such as print cloth, sized rayons and the like. It may also be used on non-fibrous sheetings of various sorts such as Mylar, cellophane, cellulose acetate and cellulose acetate butyrate, as well as the various types of vinyl copolymer sheeting materials. Other polyester, polyamide and cellulose derivative sheeting may also be used. Adhesive formulations using the above copolymer may be applied by use of a standard coating machine and may be applied from either a non-aqueous solvent system as shown below in Example 1 or from an aqueous emulsion system.

Suitable adhesive formulations on a dry basis are operative as follows;

| | Percent |
|---|---|
| Copolymer | 30–50 |
| Tetrahydroabietyl alcohol | 20–50 |
| Pigments and fillers | 20–35 |

In place of the tetrahydroabietyl alcohol may be used hydrogenated abietic esters, hydrocarbons such as the Piccolyte resins which are polyterpenes, the coumarone-indene resins and other soft resins of a non-oxidizing type.

Our preferred adhesive compositions consists of the following mixture on a dry basis:

| | Percent |
|---|---|
| Copolymer | 40 |
| Tetrahydroabietyl alcohol | 33 |
| Pigments and fillers | 27 |

The following examples are intended to be illustrative of a method of preparing useful compositions according to our invention but are not intended to limit the scope of our invention.

*Example 1.—Preparation of the copolymer*

Into each of two one-quart Duraglas bottles, the following mixture was placed:

54.2 grams of freshly washed 2-ethylhexyl acrylate
45.8 grams of freshly distilled styrene
400 ml. of distilled water
9 ml. of 35 percent isopropanol-water solution of N,N-dimethyl β-hydroxyethyl stearamido propyl ammonium dihydrogen phosphate (cationic SP).
0.35 gram of potassium metabisulfite
0.70 gram of potassium persulfate Each of the two bottles was swept with nitrogen, capped, and tumbled in a 40° C. air bath at 15 r.p.m. for 16 hours. At the end of that time, the bottles were removed from the bath, cooled to room temperature, and the small amount of coagulum which had formed in the latex removed by filtration through a coarse-woven filter cloth. The filtered latex contained 17.9 percent solids by gravimetric analysis. The blended filtrates (from the two bottles) were placed in one-quart heavy paper cartons and the cartons stored at —30° C. for 24 hours. The frozen latex samples were melted, yielding masses of white plastic products. These were combined, washed repeatedly by kneading first in distilled water, then 10/90 acetone/water by volume, then 50/50 acetone/water, then soaked for several hours in acetone alone in which the copolymer became swollen to the point of becoming translucent. The swollen mass was cut up into small pieces and dried in the air to constant weight.

One hundred and twenty grams of the dry copolymer were dissolved in 480 grams of benzene by rotation for 8 hours on a U.S. stoneware mill roller device, yielding a clear viscous dope, ready for use.

*Example 2.—Preparation of the adhesive mix*

Six hundred grams of 25 percent solids copolymer were transferred to a dough mixer of 1 gallon capacity, where it was cut with an equal amount of benzene. After milling until smooth, 120 grams of a slurry, consisting of zinc oxide, cornstarch, lanolin, and benzene were added, and again after the mixture became uniform, 240 grams of a solution of abitol (tetrahydroabietyl alcohol) 50 percent in benzene were added. An additional 300 grams of benzene was added to bring the mixture to the optimum coating viscosity.

*Example 3.—Application of the adhesive mix*

On a standard knife blade coating machine, the adhesive was coated onto a thin, sized rayon cloth. The adhesive was coated in two layers, first a thin filling layer with little or no tack, then with a heavier coat to the desired dry thickness of .0015 inch of adhesive over the cloth thickness.

*Example 4.—Results of using the adhesive mix*

The coating described in Example 3 was slit to 3/8" widths and tested as a binding tape for 35 mm. glass slides. It had satisfactory adhesion. When tested as a pressure sensitive adhesive tape for adhering to photosensitive materials, it was found to cause a minimum of fog.

The formulations prepared according to our invention are a considerable improvement over previously known adhesives inasmuch as they resist oxidation, are pressure sensitive, are not highly temperature sensitive and exhibit a minimum of photographic activity.

The polymerization of styrene with other polymerizable monomers is disclosed in the A.C.S. Monograph, "Styrene," by Bundy and Boyer, 1952, Reinhold Publishing Corporation, New York, New York.

We claim:
1. A pressure sensitive adhesive tape comprising a flexible support having thereon an adhesive containing 20–50 percent tetrahydroabietyl alcohol, 20–35 percent inert pigments and fillers and 30–50 percent of a copolymer prepared from a monomeric mixture having 70–50 mole percent styrene and 30–50 mole percent 2-ethylhexyl acrylate.

2. A pressure sensitive adhesive tape comprising a flexible support having thereon an adhesive containing 33 percent tetrahydroabietyl alcohol, 27 percent inert pigments and fillers and 40 percent of a copolymer prepared from a monomeric mixture containing 30–50 mole percent 2-ethylhexyl acrylate and 70–50 mole percent styrene.

References Cited in the file of this patent

UNITED STATES PATENTS

| | | |
|---|---|---|
| 2,649,439 | Brown | Aug. 18, 1953 |
| 2,795,515 | Lavanchy | June 11, 1957 |

FOREIGN PATENTS

| | | |
|---|---|---|
| 624,764 | Great Britain | June 16, 1949 |